United States Patent
Wu

(10) Patent No.: US 8,077,150 B2
(45) Date of Patent: Dec. 13, 2011

(54) STORABLE MOUSE

(75) Inventor: Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 351 days.

(21) Appl. No.: 12/557,333

(22) Filed: Sep. 10, 2009

(65) Prior Publication Data

US 2011/0006987 A1    Jan. 13, 2011

(30) Foreign Application Priority Data

Jul. 10, 2009   (TW) ................................ 98123322 A

(51) Int. Cl.
*G06F 3/033*    (2006.01)
*G09G 5/08*     (2006.01)

(52) U.S. Cl. ........................................................ 345/163
(58) Field of Classification Search ................... 345/163
See application file for complete search history.

(56) References Cited

U.S. PATENT DOCUMENTS

| | | | |
|---|---|---|---|
| 6,921,054 B2 * | 7/2005 | Doan ......................... | 248/118.5 |
| 2005/0116934 A1 * | 6/2005 | Yin et al. ...................... | 345/163 |
| 2005/0227747 A1 * | 10/2005 | Song .......................... | 455/575.3 |

* cited by examiner

*Primary Examiner* — Joseph Haley
*Assistant Examiner* — Nicholas Lee
(74) *Attorney, Agent, or Firm* — Kirton & McConkie; Evan R. Witt

(57) ABSTRACT

A storable mouse is provided. The storable mouse includes a mouse body, a connecting element and a protective case. A connecting surface of the connecting element is coupled with a rear surface of the mouse body such that bilateral sides of the connecting element are rotatable with respect to the mouse body. The protective case is pivotally coupled with the connecting element and rotatable with respect to the connecting element. The protective case includes a receptacle. When the protective case is folded toward the mouse body, the upper surface of the mouse body is sheltered by and accommodated within the receptacle of the protective case.

8 Claims, 4 Drawing Sheets

STORABLE MOUSE

FIELD OF THE INVENTION

The present invention relates to a storable mouse, and more particularly to a storable mouse that is rotatable and foldable to be stored within a protective case.

BACKGROUND OF THE INVENTION

Due to the amazing power of computers, computers become essential data processing apparatuses in our daily lives. For example, the users could acquire important information (e.g. meteorological information, traffic information, news or uniform invoice number) via the computers. In addition, the users could communicate with their friends through instant messaging software, e-mails or video transmission by using the computers. As known, a human-machine interface input device is an essential component of the computer for communicating the user and the computer. In particular, a mouse is a widely-used human-machine interface input device.

Generally, for different users and different environments, the volume and size of the mouse are important factors influencing the operating comfort and storing convenience. For example, the man's palm and the woman's palm usually have different sizes. A too large or too small mouse results in a poor hand gesture. If an improper mouse is used for a long term, the user is readily suffered from muscle injuries. Due to the portability, notebook computers become essential components for the businessmen when they travel to other places. For most users, since the touch pad is not easy-to-use, they prefer and get use to using the mouse. Under this circumstance, the user needs to simultaneously carry the notebook computer and the mouse. As the volume of the notebook computer is developed toward minimization, the volume of the mouse needs to be decreased in order to enhance the efficacy of carrying and storing the mouse.

For solving these drawbacks, some literatures were focused on reduction and storage of the mouse. For example, Taiwanese Patent No. I257567 discloses a foldable computer mouse. As described in this patent, the foldable computer mouse comprises a mouse body, a sensor and an extensive element. The extensive element is pivotally coupled to a surface of the mouse body. When the extensive element is rotated in the external direction to a predetermined position, the contact area between the foldable computer mouse and the user's palm is increased. Whereas, when the extensive element is rotated in the internal direction to a recess under the bottom of the mouse body, the overall volume of the foldable computer mouse is reduced to facilitate easy storage. Moreover, when the extensive element is rotated in the external direction to a predetermined position, the foldable computer mouse could be operated by the user. Even if the extensive element is rotated to the recess, the foldable computer mouse could also be operated by the user. Taiwanese Patent No. 528185 discloses another foldable mouse. The foldable mouse comprises a holding part and two lateral wing parts. The holding part has pivotal holes. The lateral wing parts have pivotal shafts mating with the pivotal holes. As such, the lateral wing parts are pivotally coupled with the holding part. The lateral wing parts are rotatable with respect to the holding part to be unfolded toward bilateral sides of the holding part. Alternatively, the lateral wing parts and the holding part could be folded to a compact size in order to enhance the efficacy of carrying and storing the mouse.

Since the notebook computer is continuously developed toward minimization, the requirements of carrying and storing the mouse become more important. Therefore, there is a need of providing a small-sized and storable mouse.

SUMMARY OF THE INVENTION

It is an object of the present invention to provide a storable mouse, in which the overall area of the mouse is increased to facilitate the user to hold the mouse when a protective case is unfolded, and the total area of the mouse is reduced when a mouse body is stored within the protective case.

Another object of the present invention provides a storable mouse for protecting the mouse body protected from being attacked or damaged when the mouse body is stored within the protective case.

A further object of the present invention provides a storable mouse having a protective case for protecting a mouse body. When the mouse body is stored within the protective case, the click buttons and the roller of the mouse could be normally operated through the protective case.

In accordance with an aspect of the present invention, there is provided a storable mouse. The storable mouse includes a mouse body, a connecting element and a protective case. The mouse body includes an upper surface for supporting a user's palm and a rear surface. The connecting element includes a connecting surface. The connecting surface is coupled with the rear surface of the mouse body such that bilateral sides of the connecting element are rotatable with respect to the mouse body. The protective case is pivotally coupled with the connecting element and rotatable with respect to the connecting element. The protective case includes a receptacle and a supporting surface. When the protective case is folded toward the mouse body, the upper surface of the mouse body is sheltered by and accommodated within the receptacle of the protective case. Whereas, when the protective case is unfolded to be distant from the upper surface of the mouse body and the connecting element is rotated by 180 degrees, the supporting surface of the protective case is unfolded to support the user's palm.

In an embodiment, the storable mouse further includes a body pivotal hook. A first body pivotal hole is formed in the rear surface of the mouse body. The connecting surface of the connecting element includes a second body pivotal hole. The body pivotal hook penetrates through the first body pivotal hole and the second body pivotal hole such that the mouse body is coupled with the connecting element.

In an embodiment, the storable mouse further includes two case pivotal hooks. Two second case pivotal holes are respectively formed in the bilateral sides of the connecting element. The protective case includes two first case pivotal holes corresponding to the two second case pivotal holes. The two case pivotal hooks respectively penetrate through the two first case pivotal holes and the two second case pivotal holes.

In an embodiment, the mouse body further includes two click buttons at left and right sides of the upper surface.

In an embodiment, the protective case further includes a button separation seam and two protective case button shielding parts. The two protective case button shielding parts are divided by the button separation seam.

In an embodiment, when the mouse body is accommodated within the receptacle of the protective case, the two protective case button shielding parts are respectively disposed above the two click buttons of the mouse body.

In an embodiment, the storable mouse further includes two button contacts, which are disposed within the receptacle and under the two protective case button shielding parts. The click buttons are triggered through respective button contacts when respective protective case button shielding parts are depressed.

In an embodiment, a roller is arranged on the upper surface of the mouse body, a roller hole is formed in the protective case, and the roller is exposed to the roller hole when the mouse body is accommodated within the receptacle of the protective case.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a storable mouse. In a case that a protective case is unfolded, the overall area of the mouse is increased to facilitate supporting the user's palm. Whereas, in a case that the mouse body is stored within the protective case, the total area of the mouse is reduced and the mouse body is protected from being attacked or damaged. Moreover, when the mouse body is stored within the protective case, the mouse could be normally operated through the protective case.

Figure 1:
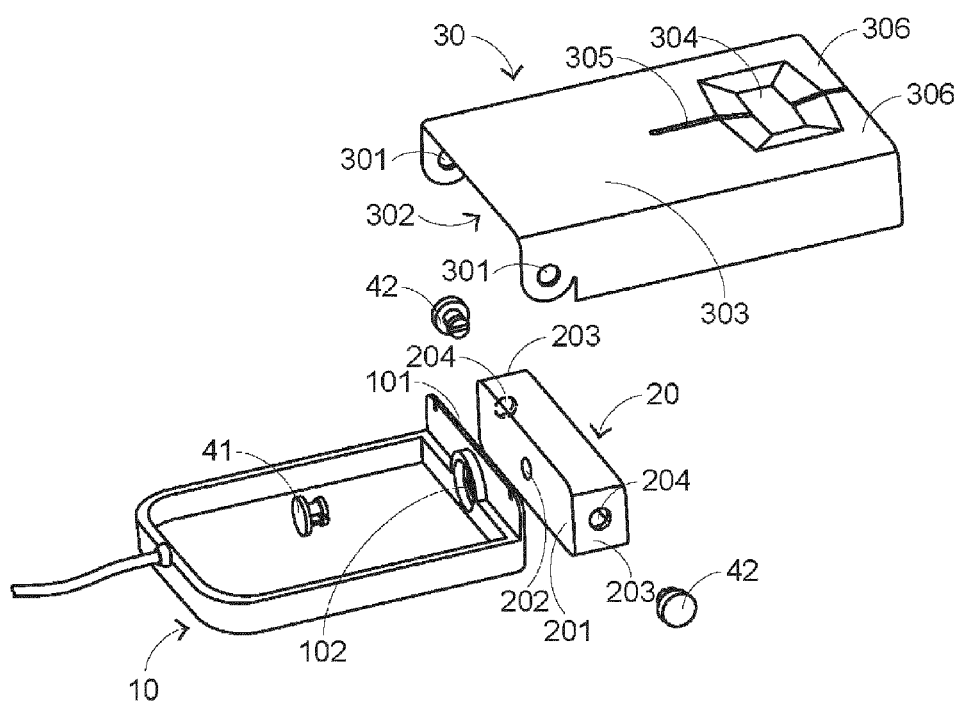
FIG. 1 is a schematic exploded view illustrating a storable mouse according to an embodiment of the present invention.
Figure 3:
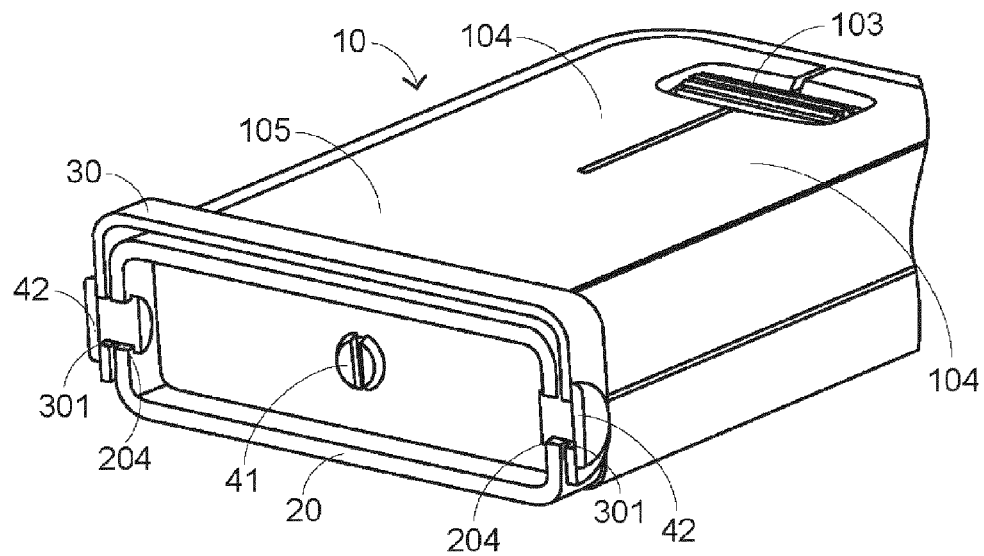
FIG. 3 is a schematic transverse cutaway view illustrating the linking relationship between the connecting element and the protective case according to the embodiment of the present invention.

FIG. 1 is a schematic exploded view illustrating a storable mouse according to an embodiment of the present invention. As shown in FIG. 1, the storable mouse comprises a mouse body 10, a connecting element 20, a protective case 30, a body pivotal hook 41 and two case pivotal hooks 42. For clearly illustrating the linking relationship between the mouse body 10 and the connecting element 20 through the body pivotal hook 41, only the lower-half portion of the mouse body 10 is shown in FIG. 1. Whereas, the overall outward appearance of the mouse body 10 is shown in FIG. 3.

Please refer to FIG. 1 again. The mouse body 10 comprises a rear surface 101. A first body pivotal hole 102 is formed in the rear surface 101. The connecting element 20 comprises a connecting surface 201. The connecting surface 201 is coupled with the rear surface 101 of the mouse body 10. The connecting surface 201 comprises a second body pivotal hole 202. Two second case pivotal holes 204 are respectively formed in bilateral sides 203 of the connecting element 20. Corresponding to the two second case pivotal holes 204, the protective case 30 comprises two first case pivotal holes 301, respectively. The protective case 30 is pivotally connected with the connecting element 20 such that the protective case 30 could be rotated with respect to the connecting element 20. In addition, the protective case 30 comprises a receptacle 302 and a supporting surface 303. In this embodiment, the mouse body 10 further comprises a roller 103 and two click buttons 104 at bilateral sides of the roller 103 (see FIG. 3).

In this embodiment, the protective case 30 further comprises a roller hole 304 and a button separation seam 305. The button separation seam 305 is extended from the middle of the protective case 30 backward the rear side of the protective case 30. Two protective case button shielding parts 306 are divided by the button separation seam 305, thereby respectively protecting the two click buttons 104 of the mouse body 10. As a consequence, after the mouse body 10 is stored within the receptacle 302 of the protective case 30, the user could still depress the two click buttons 104 of the mouse body 10 through the protective case button shielding parts 306. In addition, after the mouse body 10 is stored within the receptacle 302 of the protective case 30, the roller 103 is exposed to the roller hole 304 to be manipulated by the user.

Figure 2:
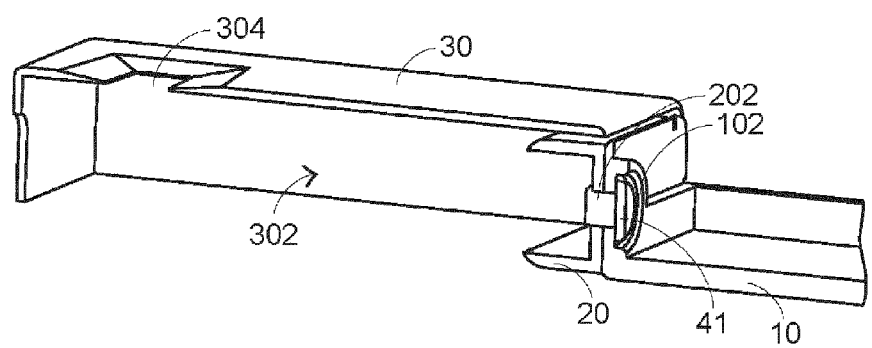
FIG. 2 is a schematic longitudinal cutaway view illustrating the linking relationship between the mouse body and the connecting element according to the embodiment of the present invention.

Via the body pivotal hook 41, the mouse body 10 is coupled with the connecting element 20. Via the case pivotal hooks 42, the connecting element 20 is coupled with the protective case 30. FIG. 2 is a schematic longitudinal cutaway view illustrating the linking relationship between the mouse body and the connecting element according to the embodiment of the present invention. As shown in FIG. 2, the body pivotal hook 41 penetrates through the first body pivotal hole 102 in the rear surface 101 of the mouse body 10 (see FIG. 1) and the second body pivotal hole 202 in the connecting surface 201 of the connecting element 20 (see FIG. 1). Via the body pivotal hook 41, the mouse body 10 is coupled with the connecting element 20, so that the bilateral sides 203 of the connecting element 20 (see FIG. 1) are rotatable with respect to the mouse body 10.

FIG. 3 is a schematic transverse cutaway view illustrating the linking relationship between the connecting element and the protective case according to the embodiment of the present invention. As shown in FIG. 3, the two case pivotal hooks 42 respectively penetrate through the two first case pivotal holes 301 and the two second case pivotal holes 204 in the left and right sides 203 of the connecting element 20 (see FIG. 1). That is, via the two case pivotal hooks 42, the protective case 30 is coupled with the connecting element 20, so that the protective case 30 is rotatable with respect to the connecting element 20.

Figure 4A:
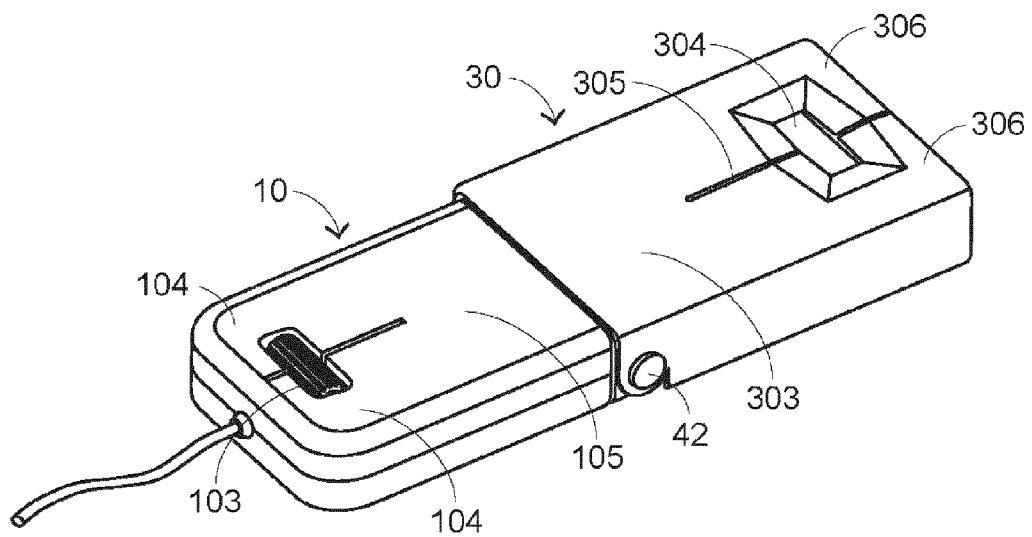
FIG. 4A is a schematic assembled view illustrating the storable mouse according to the embodiment of the present invention.

FIG. 4A is a schematic assembled view illustrating the storable mouse according to the embodiment of the present invention. As shown in FIG. 4A, the protective case 30 is in an unfolded mode. For operating the mouse, the protective case 30 is unfolded toward the backside of the mouse body 10. As such, the user's palm could be supported on the supporting surface 303 of the protective case 30. In addition, since the total area of the upper surface 105 and the supporting surface 303 of the protective case 30 is relatively larger, the mouse could be smoothly held by the user's hand in order to meet the ergonomic demands.

Figure 4B:
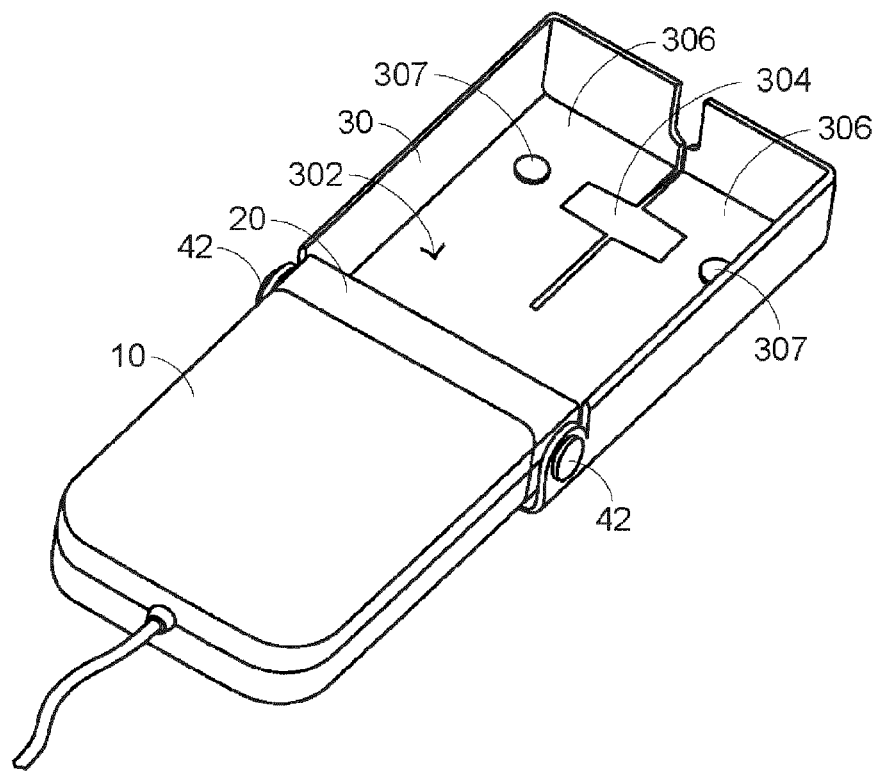
FIG. 4B is a schematic bottom view of the storable mouse as shown in FIG. 4A.

FIG. 4B is a schematic bottom view of the storable mouse as shown in FIG. 4A. As shown in FIG. 4B, the receptacle 302 is disposed in the bottom of the protective case 30 and corresponding to the mouse body 10. The mouse body 10 could be accommodated within the receptacle 302 in order to protect the mouse body 10 from being attacked or damaged. Moreover, two button contacts 307 are optionally disposed within the receptacle 302 and under the two protective case button shielding parts 306. Under this circumstance, even if the mouse body 10 is stored within the receptacle 302 of the protective case 30, the click buttons 104 of the mouse body 10 could also be triggered through respective button contacts 307 when respective protective case button shielding parts 306 are depressed.

Figure 4C:
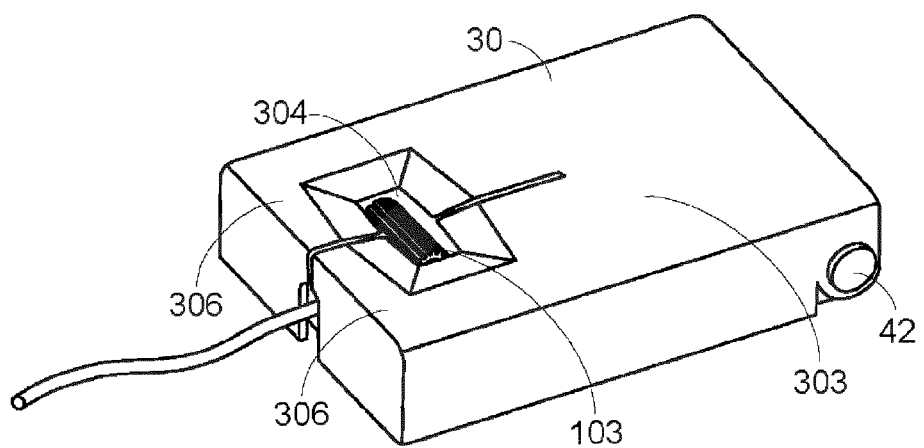
FIG. 4C is a schematic bottom view illustrating the storable mouse of the present invention in the storing mode.

FIG. 4C is a schematic bottom view illustrating the storable mouse of the present invention in the storing mode. By rotating the protective case 30, the mouse body 10 could be accommodated within the receptacle 302 that is disposed in the bottom of the protective case 30. As such, the overall volume of the mouse is reduced. Moreover, after the mouse body 10 is sheltered by and accommodated within the protective case 30, the click buttons 104 of the mouse body 10 could also be triggered by depressing respective protective case button shielding parts 306. At the same time, the roller 103 is exposed to the roller hole 304 to be manipulated by the user.

Figure 5:
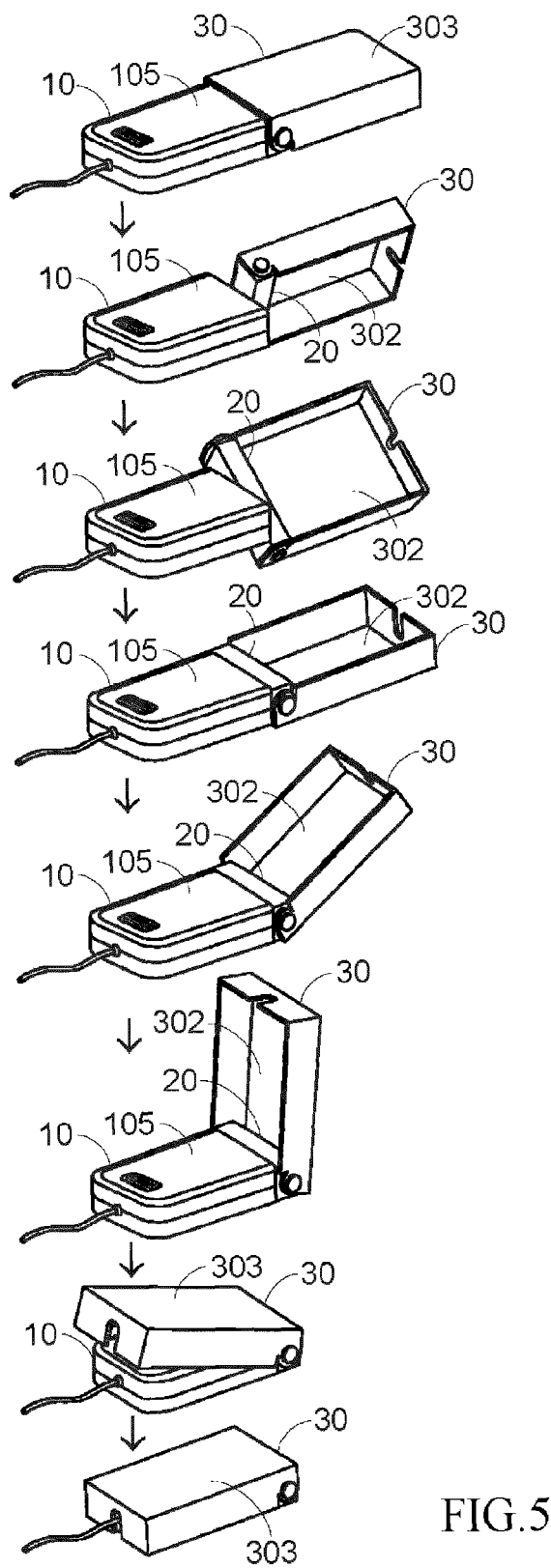
FIG. 5 schematically illustrates the actions of storing the storable mouse according to the present invention.

FIG. 5 schematically illustrates the actions of storing the storable mouse according to the present invention. For clarification and brevity, some components included in the protective case 30 are omitted. During normal operation of the mouse, the upper surface 105 of the mouse body 10 is not accommodated within the receptacle 302 of the protective case 30. At this moment, the total area of the upper surface 105 of the mouse body 10 and the supporting surface 303 of the protective case 30 is sufficient large to support the user's palm. For storing the mouse, the connecting element 20 is rotated with respect to the mouse body 10 by using the body pivotal hook 41 as the rotating shaft such that the receptacle 302 in the bottom of the protective case 30 faces upwards. Next, the protective case 30 is folded toward the mouse body 10 such that the upper surface 105 of the mouse body 10 is accommodated within the receptacle 302 of the protective case 30 and shielded by the protective case 30. Meanwhile, the mouse is stored within the protective case 30.

On the other hand, for switching the mouse from the storing mode to the normal operating mode, the actions of FIG. 5 are reversely done. That is, the protective case 30 is firstly unfolded to be distant from the upper surface 105 of the mouse body 10. Next, the connecting element 20 is rotated by 180 degrees such that the supporting surface 303 of the protective case 30 is able to support the user's palm.

From the above description, the storable mouse of the present invention is folded or unfolded according to the practical requirements. In a case that a protective case 30 is unfolded, the total area of the upper surface 105 of the mouse body 10 and the supporting surface 303 of the protective case 30 is sufficient large to support the user's palm. Whereas, in a case that the mouse body 10 is stored within the protective case 30, the total area of the mouse is reduced and the mouse body 10 is protected from being attacked or damaged. Moreover, when the mouse body 10 is stored within the protective case 30, the click buttons 104 and the roller 103 could also be normally operated through the protective case 30.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A storable mouse comprising:
   a mouse body comprising an upper surface for supporting a user's palm and a rear surface;
   a connecting element comprising a connecting surface, wherein said connecting surface is coupled with said rear surface of said mouse body such that bilateral sides of said connecting element are rotatable with respect to said mouse body; and
   a protective case pivotally coupled with said connecting element, rotatable with respect to said connecting element, and comprising a receptacle and a supporting surface,
   wherein when said protective case is folded toward said mouse body, said upper surface of said mouse body is sheltered by and accommodated within said receptacle of said protective case,
   wherein when said protective case is unfolded to be distant from said upper surface of said mouse body and said connecting element is rotated by 180 degrees, said supporting surface of the protective case is unfolded to support said user's palm.

2. The storable mouse according to claim 1 further comprising a body pivotal hook, wherein a first body pivotal hole is formed in said rear surface of said mouse body, said connecting surface of said connecting element comprises a second body pivotal hole, and said body pivotal hook penetrates through said first body pivotal hole and said second body pivotal hole such that said mouse body is coupled with said connecting element.

3. The storable mouse according to claim 2 further comprising two case pivotal hooks, wherein two second case pivotal holes are respectively formed in said bilateral sides of said connecting element, said protective case comprises two first case pivotal holes corresponding to said two second case pivotal holes, and said two case pivotal hooks respectively penetrate through said two first case pivotal holes and said two second case pivotal holes.

4. The storable mouse according to claim 1 wherein said mouse body further comprises two click buttons at left and right sides of said upper surface.

5. The storable mouse according to claim 4 wherein said protective case further comprises a button separation seam and two protective case button shielding parts, and said two protective case button shielding parts are divided by said button separation seam.

6. The storable mouse according to claim 5 wherein when said mouse body is accommodated within said receptacle of said protective case, said two protective case button shielding parts are respectively disposed above said two click buttons of said mouse body.

7. The storable mouse according to claim 6 further comprising two button contacts, which are disposed within said receptacle and under said two protective case button shielding parts, wherein said click buttons are triggered through respective button contacts when respective protective case button shielding parts are depressed.

8. The storable mouse according to claim 7 wherein a roller is arranged on said upper surface of said mouse body, a roller hole is formed in said protective case, and said roller is exposed to said roller hole when said mouse body is accommodated within said receptacle of said protective case.

* * * * *